United States Patent [19]
Walker

[11] Patent Number: 5,784,625
[45] Date of Patent: Jul. 21, 1998

[54] METHOD AND APPARATUS FOR EFFECTING A SOFT RESET IN A PROCESSOR DEVICE WITHOUT REQUIRING A DEDICATED EXTERNAL PIN

[75] Inventor: Gary Walker, Phoenix, Ariz.

[73] Assignee: VLSI Technology, Inc., San Jose, Calif.

[21] Appl. No.: 618,190

[22] Filed: Mar. 19, 1996

[51] Int. Cl.$^6$ ................................................. G06F 12/00
[52] U.S. Cl. ..................... 395/733; 395/775; 395/575; 395/275; 364/240; 364/280
[58] Field of Search ................................. 395/733, 775, 395/575, 275, 490, 700, 821, 467; 364/232.9, 246.6, 259, 280, 240

[56] References Cited

U.S. PATENT DOCUMENTS

| | | | |
|---|---|---|---|
| 5,109,506 | 4/1992 | Begun | 395/575 |
| 5,333,307 | 7/1994 | Shirk et al. | 395/575 |
| 5,381,530 | 1/1995 | Thayer et al. | 395/275 |
| 5,388,242 | 2/1995 | Jewett | 395/425 |
| 5,410,706 | 4/1995 | Farrand et al. | 395/700 |
| 5,465,360 | 11/1995 | Miller et al. | 395/700 |
| 5,530,879 | 6/1996 | Crump et al. | 395/750 |
| 5,555,423 | 9/1996 | Grochowski et al. | 395/775 |
| 5,574,943 | 11/1996 | Daftari | 395/821 |
| 5,596,741 | 1/1997 | Thome | 395/490 |
| 5,603,007 | 2/1997 | Yazdy et al. | 395/467 |

*Primary Examiner*—Ayaz R. Sheikh
*Assistant Examiner*—Eric Thlang
*Attorney, Agent, or Firm*—Wagner, Murabito & Hao

[57] ABSTRACT

A system and method for emulating the state of a soft reset within a processor device without requiring a dedicated soft reset external pin associated with said processor device. The novel system includes control circuitry coupled to a processor device for detecting a number of conditions used to cause the processor device to execute a soft reset. In processor devices that contain a write-back cache, the soft reset signal resets the configuration of the processor device and returns the processor to "real-address mode" addressing, but does not destroy the contents of the write-back cache (unlike a regular reset). Upon detecting a soft reset attempt, the novel system generates a System Management Interrupt (SMI) which is responded to by an interrupt handling routine also of the novel system. This interrupt handling routine contains a set of configuration data (stored in memory) that represents the expected state of the processor device after a soft reset. The interrupt handling routine copies this set of configuration data into the processor device and returns. By copying the set of configuration data into the processor device, a soft reset is effectively emulated without the need for a dedicated soft reset pin. The novel system advantageously reduces the overall pin count of the processor device, or, alternatively, allows an additional signal to be supplied over the dedicated pin that was used by the prior art to implement the soft reset signal.

21 Claims, 9 Drawing Sheets

450

```
ENTER
  ↓
STORE CPU CONTENTS
INTO SMM RAM      455
  ↓
CHECK SMM STATUS BITS  460
  ↓
PRIORITIZE BASED ON SMM
STATUS BITS PENDING  465
  ↓
SOFT RESET?  470
  — NO → OTHER SMIs  475
  ↓ YES
RESTORE CONTENTS OF SMM RAM
TO CPU THAT CORRESPONDS TO A
CPU RESET CONFIGURATION  480
  ↓
RETURN  485
```

FIG. 6B

METHOD AND APPARATUS FOR EFFECTING A SOFT RESET IN A PROCESSOR DEVICE WITHOUT REQUIRING A DEDICATED EXTERNAL PIN

TECHNICAL FIELD

The present invention relates to the field microprocessor design. Specifically, the present invention relates to a mechanism and method for generating a software reset within a microprocessor device without the need for an external soft reset signal pin.

BACKGROUND ART

Microprocessor devices ("processors") utilize external pins to interface with other components within a computer system. In present computer technology, as the complexity and processing power of microprocessors grow, the number of external pins required to interface the microprocessor with the other components of the computer system also increases. Increasing the number of external pins increases the cost of the microprocessor as well as the cost and complexity of the interface circuitry.

FIG. 1 illustrates the external pin layout for a prior art microprocessor package 10 based on the well known x86 architecture. The well known x86 architecture microprocessor is used in well known PC/AT compatible computer systems. The microprocessor package 10 contains a central portion 22 containing the semiconductor wafer or "die" that contains the operable circuitry of the microprocessor. As shown in FIG. 1, surrounding the central portion 22 are more than 270 external pins 20 that are internally coupled to thin leads which are themselves coupled to pads on the semiconductor die 22. Due to the large number of external pins 20 required of current microprocessor designs, there is an increasing need to provide methods and systems that reduce the number of required external pins. By reducing the number of external pins required in a microprocessor, not only is the microprocessor easier to interface within the overall computer system, but microprocessor fabrication costs decrease.

One external pin in particular is the INIT pin 30 (also called the INIT# pin when low asserted) and is shown in FIG. 1. The INIT pin 30 is a dedicated external pin used for microprocessor soft reset within an x86 architecture microprocessor. When asserted, INIT pin 30 forces the microprocessor to begin execution in a known state and places the microprocessor into a "soft reset" configuration. The microprocessor state after the INIT pin 30 is asserted (e.g., just following a soft reset) is the state after a normal reset signal is asserted except that the internal caches, write buffers, model specific registers, and floating-point registers retain the values they had prior to the assertion of the INIT pin 30. See also "Pentium™ Processor User's Manual, Volume 1: Pentium Processor Data Book," published in 1994 and available from Intel Corporation of Santa Clara, Calif. As described below, the INIT pin 30 can be used to transition certain x86 processors from "protected mode" addressing to "real-address mode" addressing.

FIG. 2 illustrates some basic addressing and performance mode transitions 35 available for certain x86 microprocessors. Upon power on, or following a normal reset, the microprocessor enters a "real-address" addressing mode 40 because under both conditions a normal reset is performed. In mode 40, the architecture of the microprocessor emulates the 8086, 8088, 80186 and 80188 microprocessors. In mode 40, the microprocessor does not interpret selectors by referring to descriptors, but instead forms linear addresses as an 8086 processor would. Specifically, the microprocessor shifts the selector left by four bits to form a 20-bit base address. The effective address is extended with four clear bits in the upper bit positions which are added to the base address to create a linear address. This is described in more detail in Chapter 9 of "Pentium™ Processor User's Manual, Volume 3: Architecture and Programming Manual," published in 1994 and available from Intel Corporation of Santa Clara, Calif.

In mode 40 of FIG. 2, when protection is enable (e.g., setting a PE bit), the microprocessor transitions into a "protected mode" 50 that is useful in multitasking environments and is also used to address more than 1 Megabyte of memory in extended addressing. This mode is described in more detail in Chapters 10–14 of the above-referenced "Pentium™ Processor User's Manual, Volume 3: Architecture and Programming Manual."

As shown in FIG. 2, from the protected mode 50, the microprocessor can transition between a System Management Mode (SMM) 70, under interrupt control, and can also transition between a virtual 8086 mode 60 wherein the microprocessor emulates an 8086 processor. Modes 60 and 70 are also described in more detail in the above-referenced "Pentium™ Processor User's Manual, Volume 3: Architecture and Programming Manual."

Importantly, one method of transitioning from protected mode 50 to real-address mode 40 is by reset. One way to cause is a reset is to assert the microprocessor's dedicated reset pin. However, this destroys information stored within the microprocessor cache memories. Microprocessors with write-back caches need to transition between protected mode and real-address mode without losing their cache information stored in the write-back cache in order to maintain data coherency. Data coherency can be destroyed if information within the write-back cache is not properly updated to main memory. To solve this problem, the INIT pin 30, when asserted, allows the microprocessor to enter the soft reset. The soft reset otherwise resets the microprocessor, switches it from protected mode 50 to real-address mode 40, but does not disturb the current state of microprocessor caches (e.g., the write-back cache).

In order to reduce microprocessor pin count, it would be advantageous to eliminate the dedicated INIT pin 30 while still allowing the advantageous soft reset functionality. In this way, the microprocessor has an effective way to transition between protected mode 50 and real-address mode 40, but has a reduced pin count.

Accordingly, the present invention provides a system and method for reducing the pin count of a microprocessor. Further, the present invention allows the above by emulating the characteristics of soft reset without using an external dedicated pin. The present invention therefore offers an effective method to transition between protected mode and real-address mode without requiring an external soft reset pin. These and other advantages of the present invention not specifically recited above will become apparent within discussions of the present invention herein.

DISCLOSURE OF THE INVENTION

A system and method are described for emulating the state of a soft reset within a processor device without requiring a dedicated soft reset external pin associated with the processor device. The present invention includes control circuitry coupled to a processor device for detecting a number of occurrences used to cause the processor device to execute a soft reset. In processor devices that contain a write-back cache, the soft reset signal resets the configuration of the processor device and returns the processor to "real-address mode" addressing, but does not destroy the contents of the write-back cache (unlike a regular reset). Upon detecting a soft reset attempt, the present invention generates a System Management Interrupt (SMI) which is responded to by an interrupt handling routine also of the present invention. This interrupt handling routine contains a set of soft reset configuration data (stored in memory) that represents the expected state of the processor device after a soft reset. The interrupt handling routine copies this set of configuration data into the processor device and returns. By copying the set of soft reset configuration data into the processor device, a soft reset is effectively emulated without the need for a dedicated soft reset pin; soft reset emulation also places the processor device into "real-address mode" addressing. The present invention advantageously reduces the overall pin count of the processor device, or, alternatively, allows an additional signal to be supplied over the dedicated pin that was used by the prior art to implement the soft reset signal.

Specifically, embodiments of the present invention include a method of resetting a processor in a computer system, said method comprising the steps of: (a) storing a soft reset configuration state of said processor within a location of a memory unit, said soft reset configuration state representing a state of said processor immediately following a soft reset of said processor; (b) detecting occurrences that cause said processor to enter said soft reset; (c) generating an interrupt signal in response to detecting of one of said occurrences; and (d) placing said processor into a soft reset state without use of an external dedicated soft reset pin in response to said interrupt signal, said step (d) further comprising the steps of: (1) accessing said soft reset configuration state; (2) copying said soft reset configuration state into said processor, said above steps of accessing and copying responsive to said interrupt signal; and (3) directing said processor to execute instructions that are located at a predetermined memory location.

Embodiments of the present invention include the above and wherein said step (b) of detecting occurrences that cause said processor to enter said soft reset comprise the steps of: detecting one of a first set of numbers written to a first input/output port of said computer system; detecting bit zero of a second input/output port change from a logical 0 to a logical 1; and detecting said processor attempting to execute a shut down cycle wherein said first set of numbers includes the set consisting of F0h, F2h, F4h, F6h, F8h, FAh, FCh, and FEh, said first input/output port is port 064h and said second input/output port is port 092h. The present invention also includes a system implemented in accordance with above.

BRIEF DESCRIPTION OF THE DRAWINGS

FIG. 6B is a flow diagram of steps of an SMM interrupt handling routine in accordance with the present invention designed to respond to an SMI generated by the method of FIG. 6A.

BEST MODE FOR CARRYING OUT THE INVENTION

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

SYSTEM ENVIRONMENT

Figure 1:
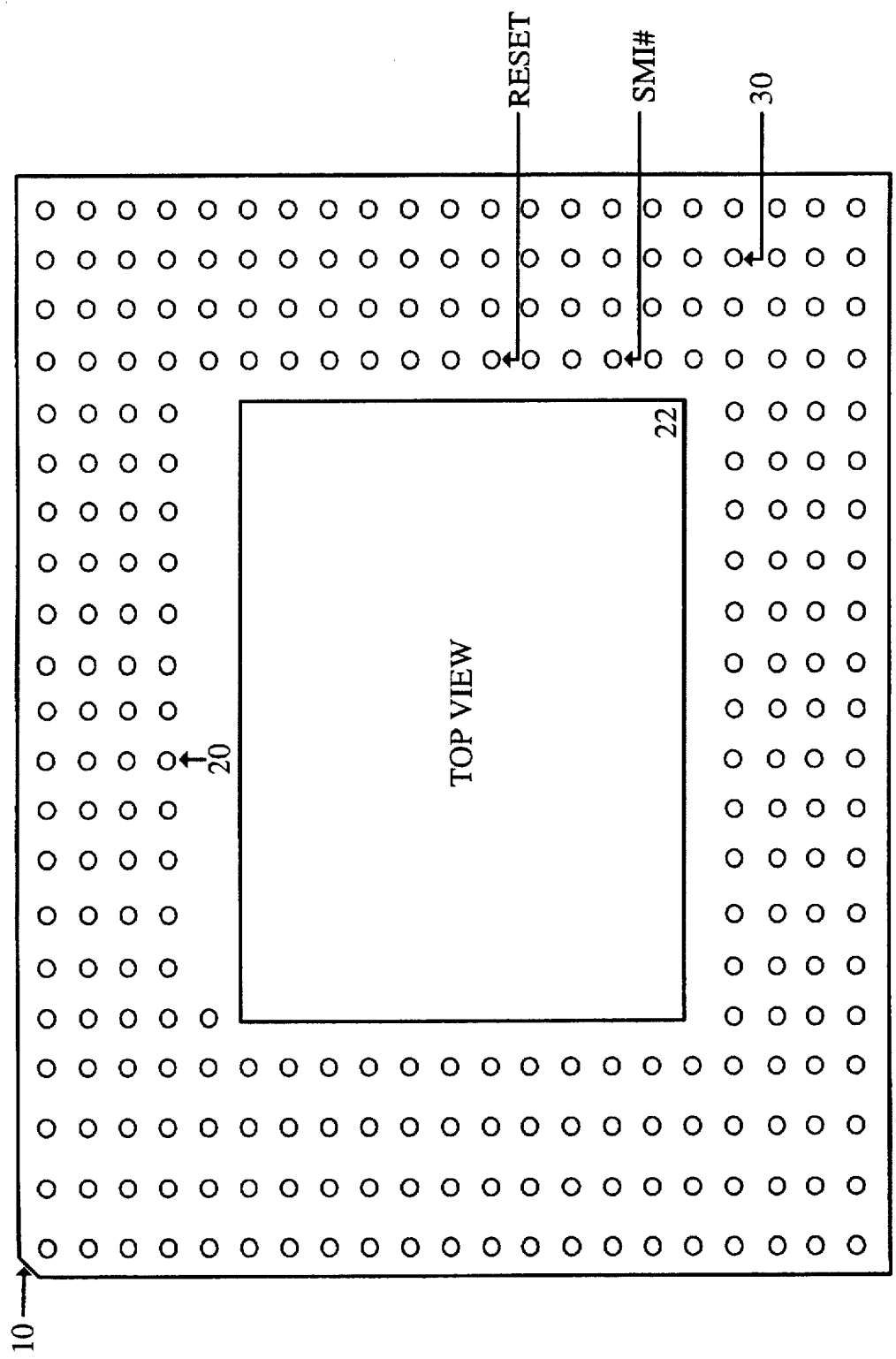
FIG. 1 illustrates the pin layout of a prior art processor of the x86 architecture type having a dedicated soft reset pin (INIT).
Figure 2:
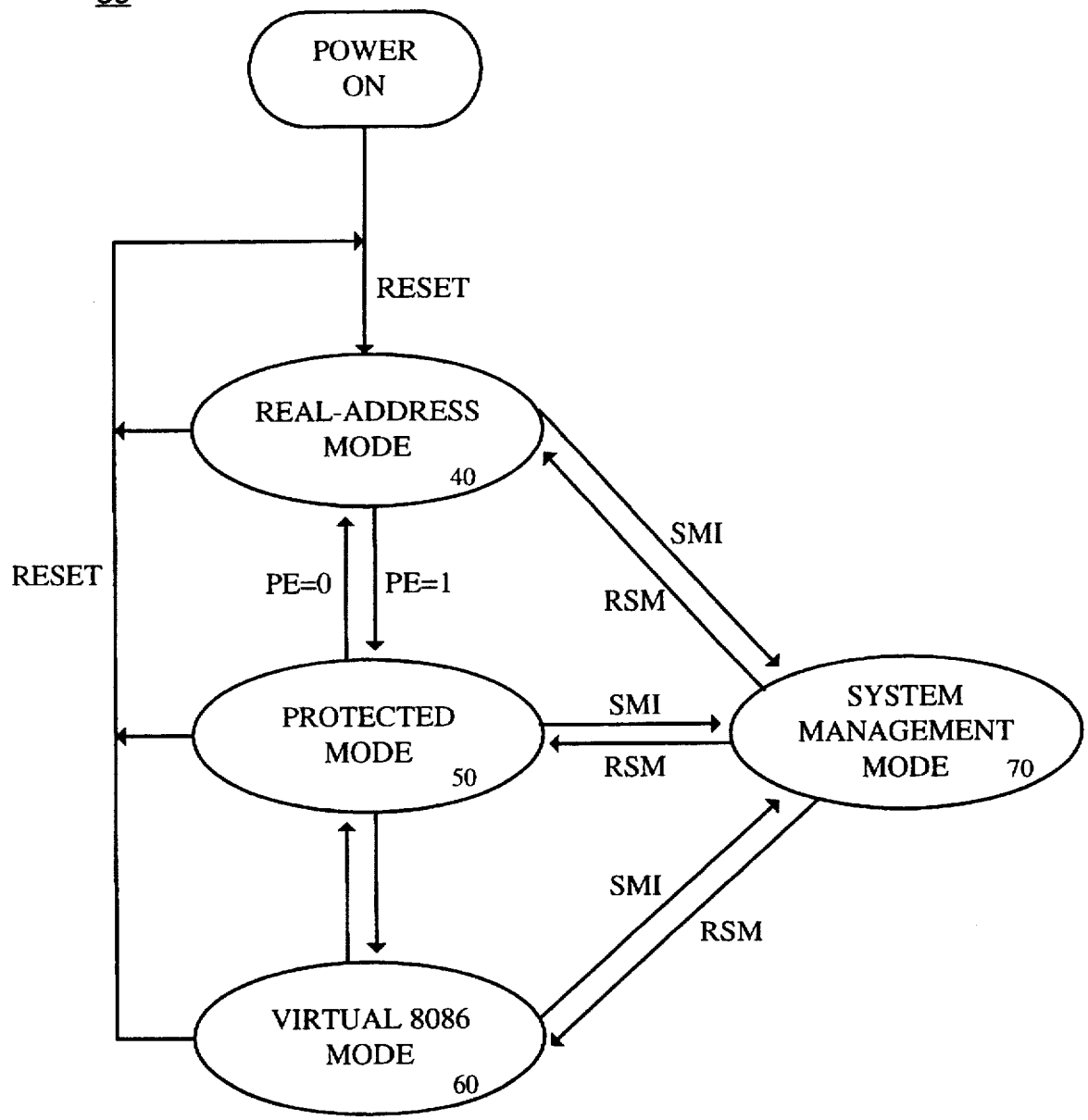
FIG. 2 is a flow diagram illustrating different addressing modes of a process of the x86 architecture type.
Figure 3:
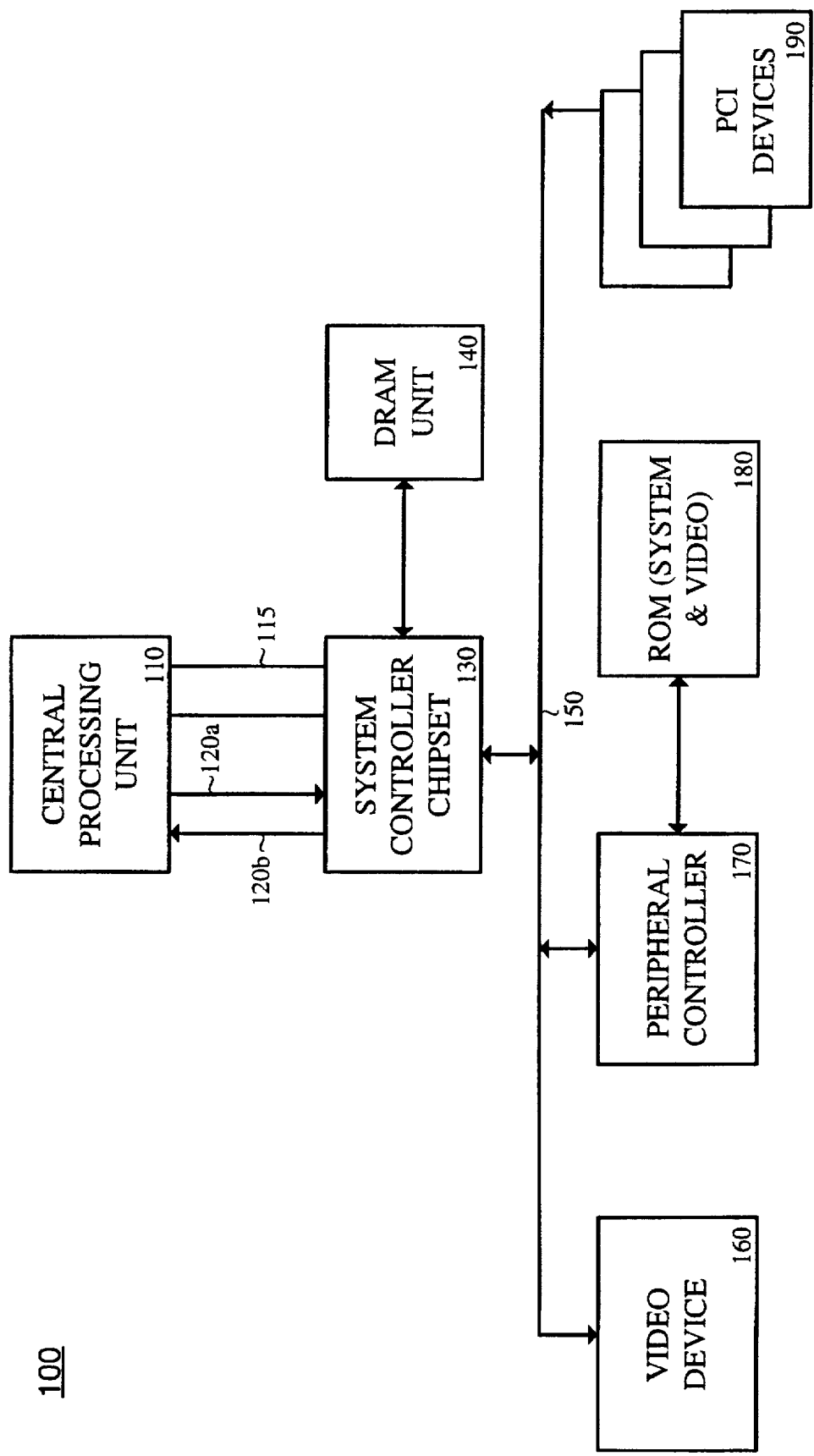
FIG. 3 is a logical block diagram of a system implemented in accordance with the present invention soft reset emulation method.

FIG. 3 illustrates an exemplary system environment 100 of the present invention. A central processing unit 110

("processor") is coupled to a CPU bus 115 which is coupled to a system controller chipset 130 ("system controller"). Except for the circuitry of the present invention (circuit 130a) described further below, a number of well known system controller chipsets can be used with the present invention. Although the present invention is well suited to operate with a number of different processors capable of soft reset, the x86 processor type is described herein as an example. One embodiment of the present invention is particularly suited for implementation in conjunction with x86 processors having a write-back cache (such as later designed 486 processors, the Pentium™, and Pentium™ Pro processors, and their equivalents), modified, however, such that the external dedicated soft reset pin is eliminated.

An SMI (System Management Interrupt) signal line 120b of FIG. 3 is coupled from the system controller 130 to the processor 110 and an SMIACT (System Management Interrupt Active) signal line 120a is coupled from the processor 110 to the system controller 130. SMI line 120b and SMIACT line 120a can equivalently be referred to as SMI# and SMIACT# if asserted low. The SMI signal line 120b and the SMIACT signal line 120a are well known in the exemplary x86 architecture. The SMI signal line 120b, when active, interrupts the processor 110 and causes the processor 110 to execute a SMM handler routine stored in computer memory. While executing the SMM handler routine, the SMIACT signal (over line 120a) is asserted, and is de-asserted otherwise.

The system controller 130 is also coupled to a DRAM (Dynamic Random Access Memory) unit 140. The system controller 130 is coupled to a well known Peripheral Component Interconnect (PCI) bus 150. A video device and/or video card 160 is coupled to the PCI bus 150. Also coupled to the PCI bus 150 is a peripheral controller 170 which interfaces with a read only memory device (ROM) 180 containing system and video ROM. A number of PCI devices can optionally be coupled to the PCI bus 150.

SR DETECTION CIRCUIT 130a

Figure 4:
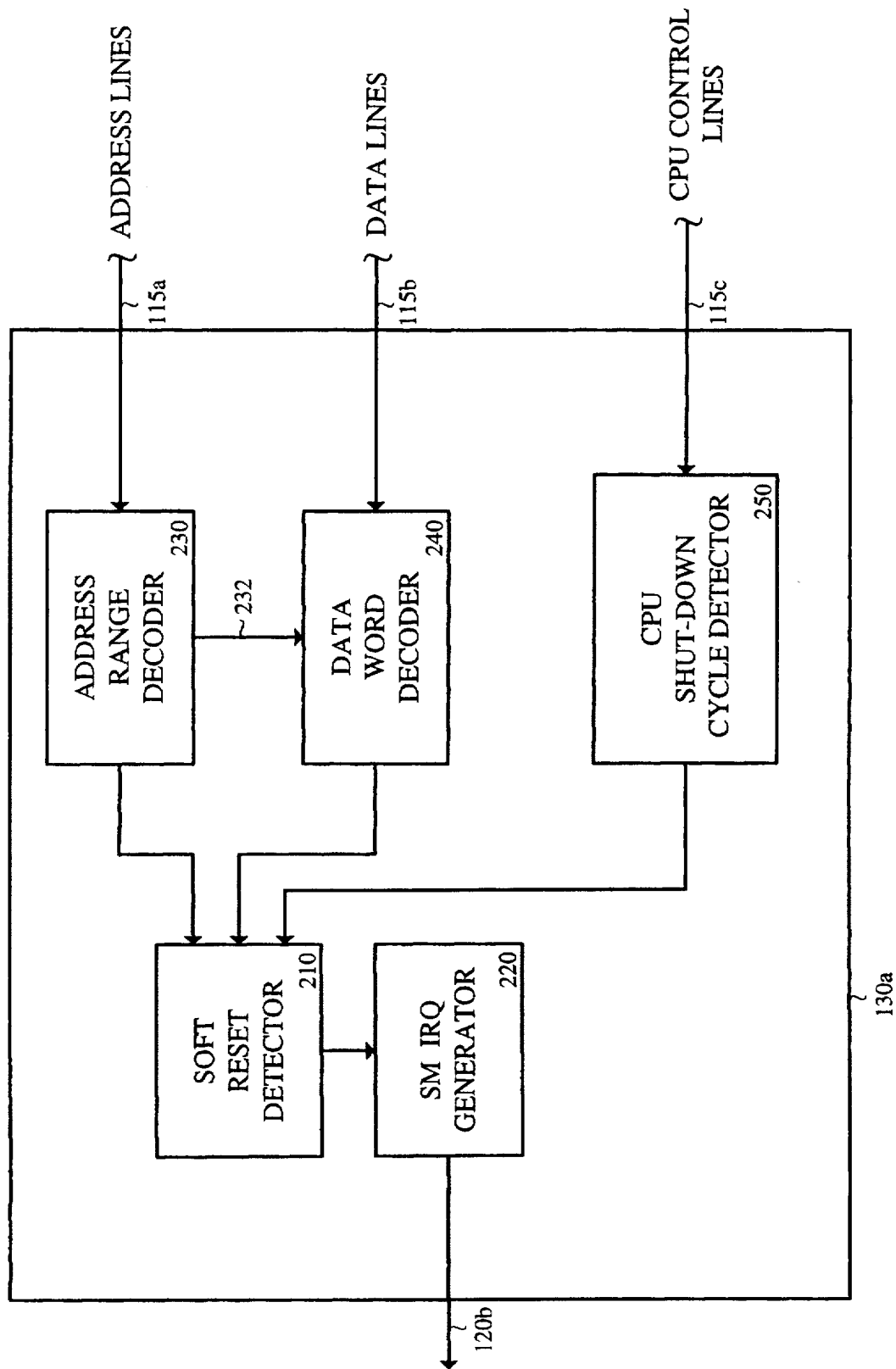
FIG. 4 is a logical block diagram of circuitry of the present invention for defecting a soft reset attempt and for generating an interrupt in response thereto.

Within the system controller 130, the present invention includes a soft reset detection and SMI generation (SR) circuit 130a which is illustrated within FIG. 4. The SR circuit 130a detects occurrences indicating that processor 110 is attempting to soft reset. SR circuit 130a is coupled to the processor 110 (FIG. 3) using an interface that includes address lines 115a, data lines 115b and processor (CPU) control lines 115c. Lines 115a-115c originate from the CPU bus 115 (FIG. 3). The address lines 115a are coupled to an address range decoder circuit 230. Decoder 230 detects when certain predetermined address ranges are presented by the processor 110 over address lines 115a. The address range decoder 230 is programmed to recognize a number of different address ranges, including input/output port numbers. In one embodiment of the present invention, the decoder circuit 230 is programmed to recognize when port 92h (hex) and port 64h (hex) are accessed by the processor 110. A number of well known internal circuits and methods can be used to implement decoder circuit 230. Specifically, a number of power management circuits are available within well known chipsets that implement address decoding functionality as described above (e.g., for power down detection). This known technology can be used in address range decoder circuit 230. Upon detection of a programmed address range over address lines 115a, decoder circuit 230 generates a coded control signal to a soft reset detector circuit 210.

Circuit 130a of the present invention also includes a programmable data word decoder circuit 240 coupled to data lines 115b. Decoder circuit 240 detects when certain predetermined data values are presented by processor 110 over the data lines 115b. A number of well known circuits can be used to implement decoder circuit 240. Upon detection of a programmed data value over data lines 115b, decoder circuit 240 generates a coded control signal to soft reset detector circuit 210. In one embodiment of the present invention, the decoder circuit 240 is programmed to recognize when data values F0h, F2h, F4h, F6h, F8h, FAh, FCh, and FEh are presented over data lines 115b by the processor 110. Decoder circuit 240 also receives a signal over line 232 from the address range decoder circuit 230. This signal indicates when decoder circuit 230 detects data storage into port 92h. When line 232 is active, data word decoder circuit 240 records the data value over bit zero of the data lines 115b. If bit zero changes from a logical 0 to a 1 when port 92h is written, decoder circuit 240 generates a coded control signal to the soft reset detector 210.

Circuit 130a of FIG. 4 also contains a CPU Shut-Down cycle detector 250 which is coupled to CPU control lines 115c. There are various well known conditions (e.g., multiple fault conditions) that cause the processor 110 to enter a shut-down cycle. Upon a shut-down cycle, well known CPU control lines carry shut-down control signals to indicate the processor shut-down cycle. The detector circuit 250 of the present invention is programmed to recognize these shut-down control signals. Upon detecting the shut-down control signals, the detector circuit 250 generates a coded control signal to the soft reset detector 210. It is appreciated that the shut-down detector 250 is optional in many embodiments of the present invention because some processors 110 are not able to respond to an SMI with a handling routine when they are entering a shut down cycle.

The soft reset detector circuit 210 of FIG. 4 is programmed to recognize when certain processor occurrences are detected that cause a soft reset condition within the scope of the present invention. Upon detecting a soft reset condition, the detector circuit 210 generates a signal to an SM interrupt generator circuit 220. The soft reset detector circuit 210 receives coded control signals from decoder circuits 230 and 240 and from CPU shut-down cycle detector circuit 250. In one embodiment, detector circuit 210 is programmed such that it responds when data values F0h, F2h, F4h, F6h, F8h, FAh, FCh, and FEh are detected by data word decoder 240 and address range decoder 230 also indicates a write to input/output port 64h. Further, in this embodiment, detector circuit 210 is programmed such that it responds when input/output port 92h is written with data and data bit zero of port 92h changes from a 0 to 1. Soft reset detector circuit 210 also responds upon receiving an indication from CPU shut-down cycle detector circuit 250 that processor 110 is entering a shut-down cycle.

The SM interrupt generator circuit 220 of FIG. 4 generates an SM interrupt signal over line 120b to the processor 110 upon receiving an appropriate signal from the soft reset detector 210. It is appreciated that after performing the 10 access to generate the soft reset, as indicated by detector circuits 230 and 240, internal software executes a halt cycle which prevents the processor 110 from executing any other cycles until the soft reset occurs. However, even if the processor 110 is in the halt state, it still responds to the SMI generated in accordance with the present invention over line 120b by generator circuit 220.

As discussed above, some processors are not capable of invoking an SMI handling routine while entering a shut down cycle. In these cases, the SMI generated by the generator circuit 220 of the present invention is ignored by these processors as they enter the shut down cycle.

SMM MEMORY MAP

Figure 5:
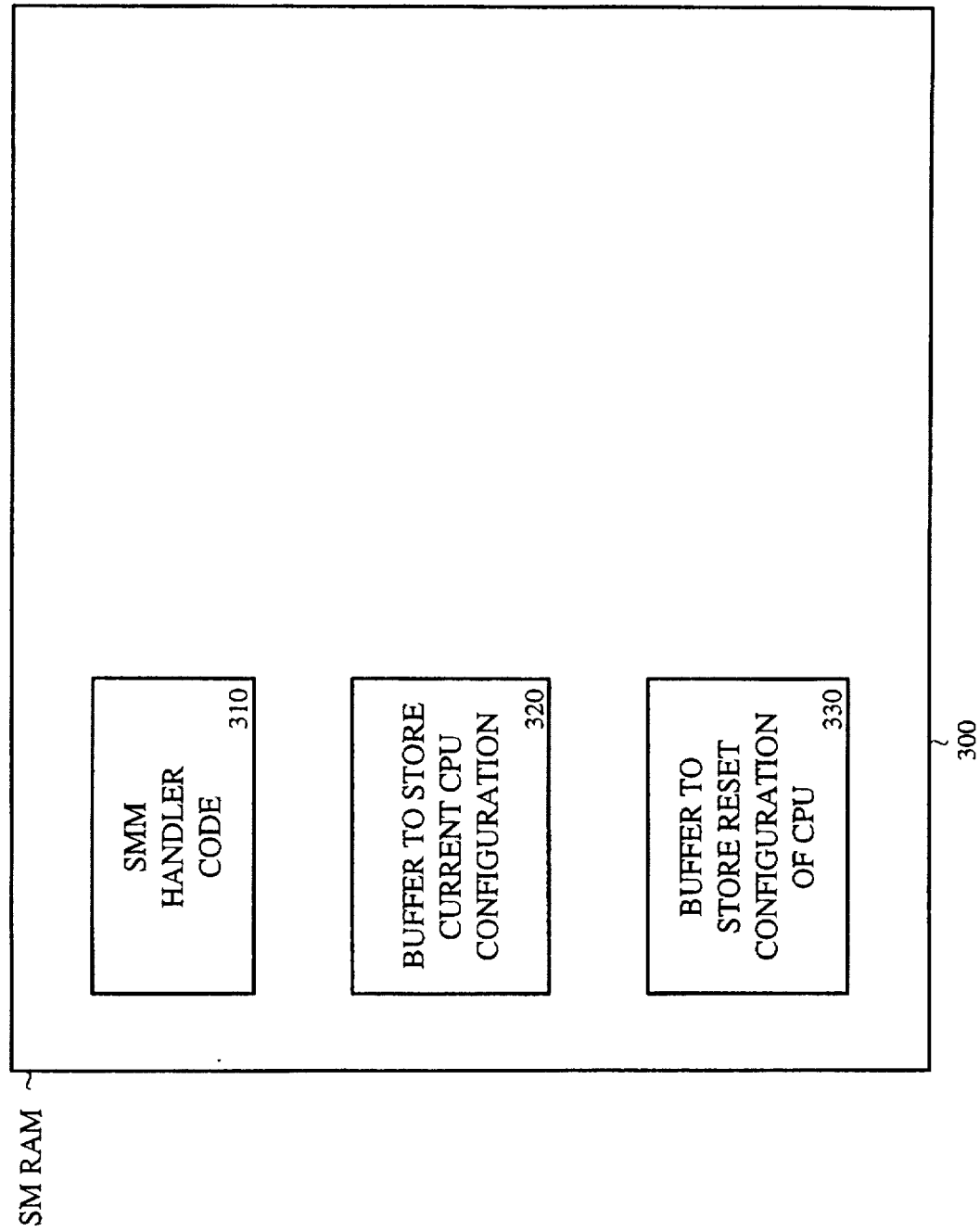
FIG. 5 is a memory space diagram of System Management Mode (SMM) RAM in accordance with the present invention.

FIG. 5 illustrates a memory map of System Memory RAM (SM RAM) 300 in accordance with the present invention. SM RAM 300 is a portion of the DRAM set aside for System Memory Management functionality within the x86 architecture and normal applications do not have access to the SM RAM 300. SM RAM 300 is divided into a memory portion 310 for containing an SMM handler routine also referred to as an SMI routine. Upon receiving an SMI, processor 110 begins execution of the SMM handler routine stored in memory portion 310. SM RAM 300 also contains a buffer memory 320 for containing the current state (configuration) of the processor 110 that exists upon entering the SMM handler routine. The SMM RAM 300 also contains a second buffer 330 used to store a predefined soft reset configuration of the processor 110. The predefined soft reset configuration is typically known for specific processors but can also be determined for a given microprocessor through procedures described further below with reference to FIG. 7A and FIG. 7B.

In one embodiment of the present invention, the SM RAM 300 is mapped to special memory areas within the DRAM 140 of the computer system when the processor 110 is in the System Management Mode (e.g., when responding to an SMI). With reference to the exemplary x86 processor architecture, memory addressing areas can be divided into sections. Table I below illustrates an exemplary partial memory assignment.

The instructions and data stored within these memory areas is typically initially stored in ROM 180 and then copied into the RAM 140 upon system power up (e.g., using a well known method referred to as shadowing).

TABLE I

| ADDRESS RANGE | ALLOCATION |
|---|---|
| A0000-FFFFF | Dedicated Memory Ranges |
| F0000-FFFFF | Dedicated for System |
| E0000-EFFFF | Dedicated for Peripherals (normally) |
| C0000-CFFFF | Dedicated for Video Device/Controller (normally) |
| A0000-BFFFF | Dedicated for Video RAM (normally) |

It is appreciated that the memory assignments of Table I are the normal assignments for these dedicated memory ranges and they can be altered within the scope of the present invention. In one exemplary embodiment, the video RAM memory range (e.g., A0000–BFFFF) as identified in Table I is located within memory elements of the video controller 160 (FIG. 3) and not the DRAM 140. However, there is a corresponding memory map for this same video range (e.g., A0000–BFFFF) stored in DRAM 140 (FIG. 3). The SMM 300 used by one embodiment of the present invention is mapped into range A0000–BFFFF of the DRAM 140.

Specifically, when the processor 110 is operating within the System Management Mode, the SM RAM 300 is mapped to a suitable location within the memory range A0000–BFFFF of the DRAM unit 140. When in the System Management Mode, the SMIACT line 120a is asserted and memory accesses to the memory range A0000–BFFFF are redirected by the present invention to the DRAM unit 140, instead of being directed to the video RAM of the video device 160. When the SMIACT line 120a is not asserted, accesses to the memory range A0000–BFFFF are directed by the present invention to the video RAM of the video device 160. In accordance with the above exemplary embodiment, the SM RAM 300 of the present invention is effectively placed into a memory range that is not accessible by normal applications.

The reset configuration of the processor 110 stored in the memory portion 330 can be obtained from databooks of the processor manufacturer and stored in memory according to the preferred embodiment of the present invention. Alternatively, the soft reset configuration of processor 110 can be determined by sampling the configuration state of processor 110 by generating an SMI immediately after causing a manual soft-reset condition using a prior art processor having an external soft reset pin (e.g., INIT pin 30). Under either implementation above used to obtain the soft reset configuration, the soft reset configuration is thereafter stored in memory portion 330 for subsequent use. When predefined and stored in memory, typically the soft reset configuration is stored in ROM 180 and then copied into the above referenced memory portion 330 in DRAM 140 upon power up.

The soft reset configuration for processors used in accordance with the preferred embodiment of the present invention is typically available from the processor manufacturer. The soft reset configuration for the exemplary x86 architecture processor is given in Table II below:

TABLE II

| REGISTER | SOFT RESET CONFIGURATION |
|---|---|
| EFLAGS | 00000002H |
| EIP | 0000FFF0H |
| CR0 | CD AND NW ARE UNCHANGED, BIT 4 IS SET TO 1, ALL OTHERS CLEARED |
| CR2/CR3/CR4 | 00000000H |
| CS | SELECTOR=0F000H; BASE=0FFFF000H LIMIT=0FFFFH; AR=PRESENT, READ/WRITE, ACCESSED |
| SS, DS, ES, FS, GS | SELECTOR=0000H; BASE=0000H LIMIT=0FFFFH; AR=PRESENT, READ/WRITE, ACCESSED |
| EDX | 000005xxH |
| EAX | 0 |
| EBX, ECX, ESI, EDI, EBP, ESP | 00000000H |
| LDTR | SELECTOR=0000H; BASE=00000000H LIMIT=0FFFFH; AR=PRESENT, READ/WRITE |
| GDTR, IDTR | BASE=00000000H; LIMIT=0FFFFH AR=PRESENT, READ/WRITE |
| DR0, DR1, DR2, DR3 | 00000000H |
| DR6 | FFFF0FF0H |
| DR7 | 00000400H |
| TIME STAMP COUNTER | UNCHANGED |
| CONTROL AND EVENT SELECT | UNCHANGED |
| TR12 | UNCHANGED |
| ALL OTHER MODEL SPECIFIC REGISTERS (MSRS) | UNCHANGED |
| DATA AND CODE CACHE TLBS | INVALID |
| BTB | INVALID |

The soft reset configuration of Table II is copied into memory portion 330 of the SMM RAM 300 in accordance with the preferred embodiment of the present invention for soft reset emulation.

SOFT RESET DETECTION PROCEDURE

Figure 6A:
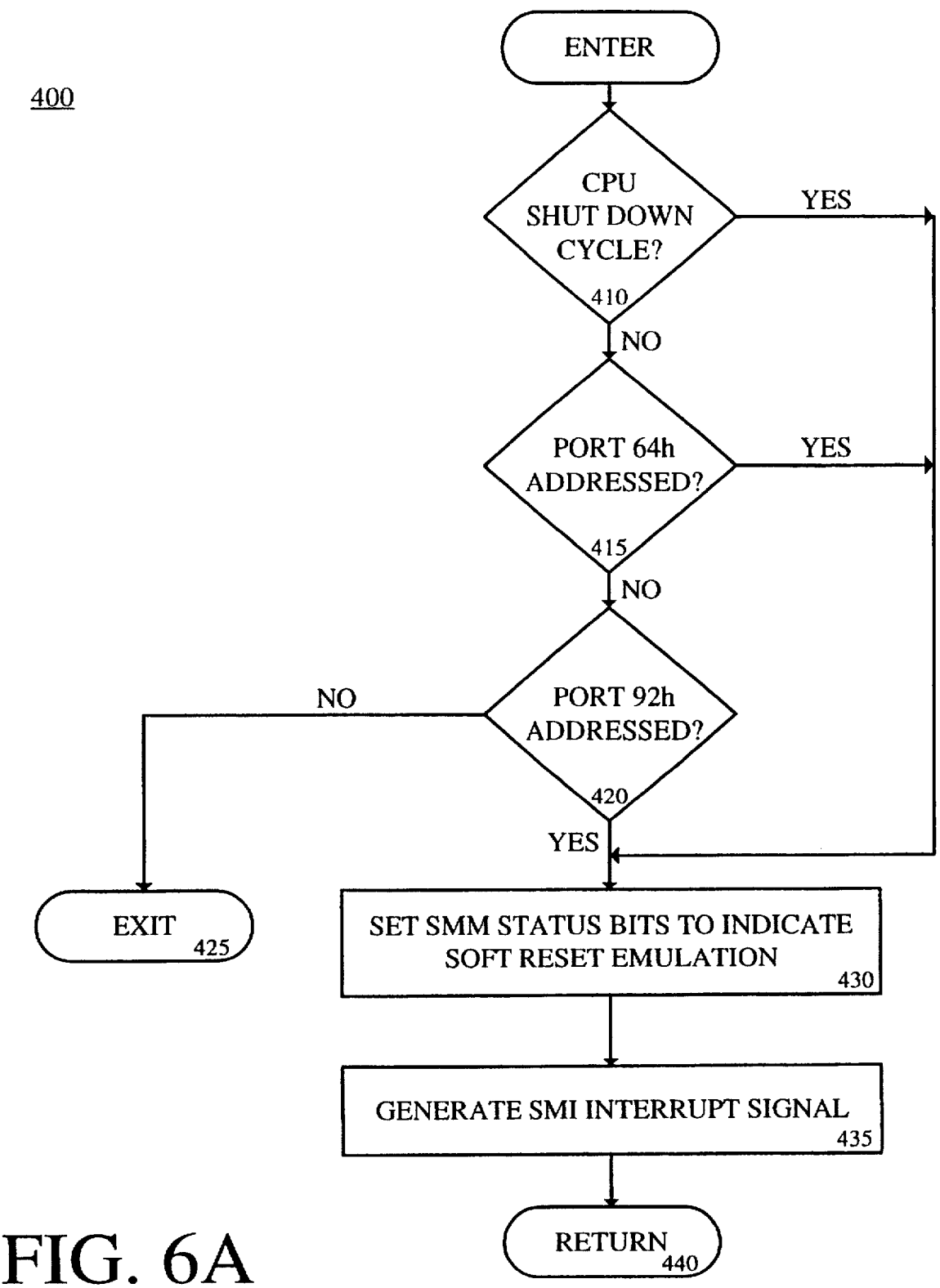
FIG. 6A is a flow diagram of steps performed by the present invention method for soft reset detection and System Management Interrupt (SMI) generation.

FIG. 6A illustrates a process flow diagram of steps 400 of the present invention for detecting a soft reset condition and generating an SMI in response thereto. Process 400 begins with steps 410-420 that check for occurrences that cause a soft reset condition. At step 410, the soft reset detector circuit 210 checks if it received coded signals from CPU shut-down cycle detector circuit 250 to indicate that a processor shut-down cycle occurred. If so, processing flows to step 430 and if not, processing flows to step 415. At step 415, soft reset detector circuit 210 checks if it received coded signals from detector circuits 230 and 240 (FIG. 4) to indicate that a value of F0h, F2h, F4h, F6h, F8h, FAh, FCh, or FEh was written to input/output port 64h. If so, processing flows to step 430 and if not, processing flows to step 420. At step 420, soft reset detector circuit 210 checks if it received coded signals from detector circuits 230 and 240 (FIG. 4) to indicate that a bit zero of the data of input/output port 92was changed from a 0 to a 1. If so, processing flows to step 430 and if not, processing flows to step 425 where process 400 exits to be repeated according to a predetermined frequency. It is appreciated that steps 410, 415 and 420 can be performed simultaneously.

At step 430 of FIG. 6A, the present invention system controller 130 detects an attempt to cause a soft reset. In response, circuit 130a of the present invention sets SMM status bits to indicate that an SMI is to be generated and that the SMI is to emulate a soft reset. These SMM status bits are set because there are a number of different functions the SMM handler routine can typically perform aside from emulating a soft reset (e.g., power management, etc.). By setting a codeword or codebit in the SMM status bits at step 430, the SMM handler routine is informed of its proper function when called.

At step 435, the soft reset detector circuit 210 generates a signal to cause the SM interrupt generator circuit 220 to generate an SMI over line 120b to the processor 110. At this point, the processor 110 is instructed to access memory location 310 of the SM RAM 300 to execute the SMM handler routine stored therein.

Because the activity of steps 410, 415, and 420 (FIG. 6A) are continually active, process 400 is repeated depending on the detected soft reset occurrences.

SOFT RESET EMULATOR SMM HANDLER ROUTINE

FIG. 6B is a flow diagram of an SMM handler routine 450 in accordance with the present invention. Reference is concurrently made to FIGS. 3-5. Process 450 is executed in response to an SMI generated at step 435 of process 400 (FIG. 6A). The instructions that implement process 450 are located in memory portion 310 of SM RAM 300. Typically, this process 450 is initially stored in ROM 180 and copied into a location of DRAM 140 upon system power up.

Processor 110 begins execution of step 455 upon receiving an SMI over line 120b. At step 455, the present configuration indicating the internal state of the processor 110 is stored into memory location 320 of the SM RAM 300. The processor configuration consists of all values of the internal registers, flags, status bits, enable bits, etc., that are stored within processor 110. Although step 455 is well suited to operate with a number of processor types, Table III below illustrates an exemplary format used by one embodiment of the present invention to store the processor configuration for an exemplary x86 processor type.

TABLE III

| MEMORY OFFSET | REGISTER |
|---|---|
| XFFC | CR0 |
| XFF8 | CR3 |
| XFF4 | EFLAGS |
| XFF0 | EIP |
| XFEC | EDI |
| XFE8 | ESI |
| XFE4 | EBP |
| XFE0 | ESP |
| XFDC | EBX |
| XFD8 | EDX |
| XFD4 | ECX |
| XFD0 | EAX |
| XFCC | DR6 |
| XFC8 | DR7 |
| XFC4 | TR |
| XFC0 | LDTR |
| XFBC | GS |
| XFB8 | FS |
| XFB4 | SS |
| XFB0 | DS |
| XFAC | CS |
| XFA8 | ES |
| XFA7-FF04 | RESERVED |
| XF02 | HALT AUTO RESTART |
| XF00 | I/O TRAP RESTART |
| XEFC | SMM REV.ID. |
| XEF8 | STATE DUMP BASE |
| XEF7-XE00 | RESERVED |

In the present invention, X can be set to cover a number of different memory ranges depending on the location of memory portion 320.

Within Table III, a number of memory areas are marked "reserved." These areas are set aside to receive soft reset configuration information that may not be specifically outlined by the processor manufacturers. In these cases, the soft reset configuration can be obtained by the above specified method of causing a manual soft reset and then recording the data output by the processor. By examining the memory regions marked as "reserved" the full soft reset configuration is then obtained.

At step 460 of FIG. 6B, the present invention SMM handler process checks the SMM status bits in memory to determine the cause of the SMI. At step 465, the SMM handler process 450 prioritizes (e.g. arbitrates) between the various SMI requests that can be received simultaneously, if any (e.g., if soft reset emulation and power management SMI are simultaneously received). At step 470, the present invention determines if the current SMI request indicates a soft reset emulation based on the information within the SMM status bits. If not, then step 475 is entered where the processor 110 executes other optionally included SMM handler routines (e.g., power management, etc.). At step 470, if a soft reset emulation was indicated, then processing flows to step 480. At step 480, the present invention overwrites the current configuration of the processor by copying the soft reset configuration stored in memory portion 330 to the processor 110 and exits the SMM handler process 450 via step 485. The soft reset configuration in accordance with one embodiment of the present invention is illustrated in Table II above.

At step 480, after restoring the soft reset configuration to processor 110, processor 110 is instructed to execute instructions at a predetermined memory location, as is well known following a soft reset condition.

By restoring the contents of memory portion 330 to the processor 110, in lieu of the contents of memory portion 320, the present invention effectively configures the processor 110 into a soft reset state upon exiting the SMM handler routine 450. In this case, the internal cache information is not disturbed. In accordance with the present invention, the INIT pin 30 is effectively eliminated for the soft reset function, e.g., it is not required to invoke or generate a soft reset for processor 110.

In an alternative embodiment of the present invention, the reset configuration of processor 110 can be determined by using a prior art processor having an INIT pin 30 and sampling its soft reset configuration. This embodiment is useful in cases where the soft reset configuration is not given. Generally, the prior art processor is placed into a soft reset condition and its configuration is sampled and saved. This procedure is shown in FIG. 7A and FIG. 7B.

Figure 7A:
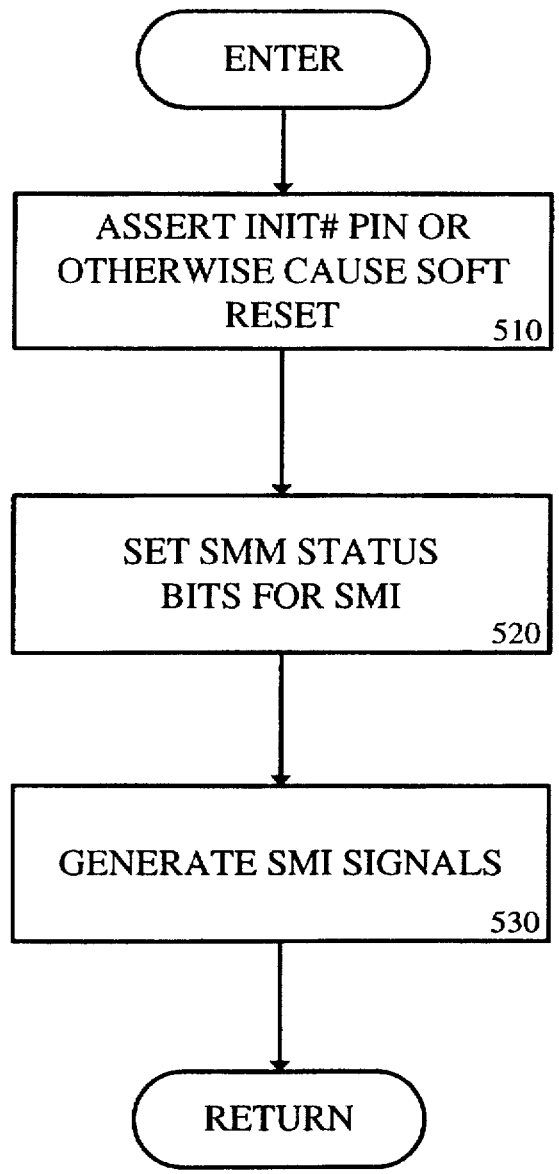
FIG. 7A is a flow diagram of steps of the present invention used to generate SMI immediately following a soft reset of a processor device.

With reference to FIG. 7A, process 500 is shown. The computer system asserts the external soft reset pin (e.g., INIT pin 30) of the prior art processor at step 510 to cause a soft reset. At step 520, the system controller 130 sets the SMM status bits to indicate the purpose of the SMI to be generated (e.g., to record the soft reset configuration). A codeword or codebit for this purpose is then placed into the SMM status bits. At step 530, the system controller 130 generates an SMI over line 120b to the processor. Process 500 then exits.

Figure 7B:
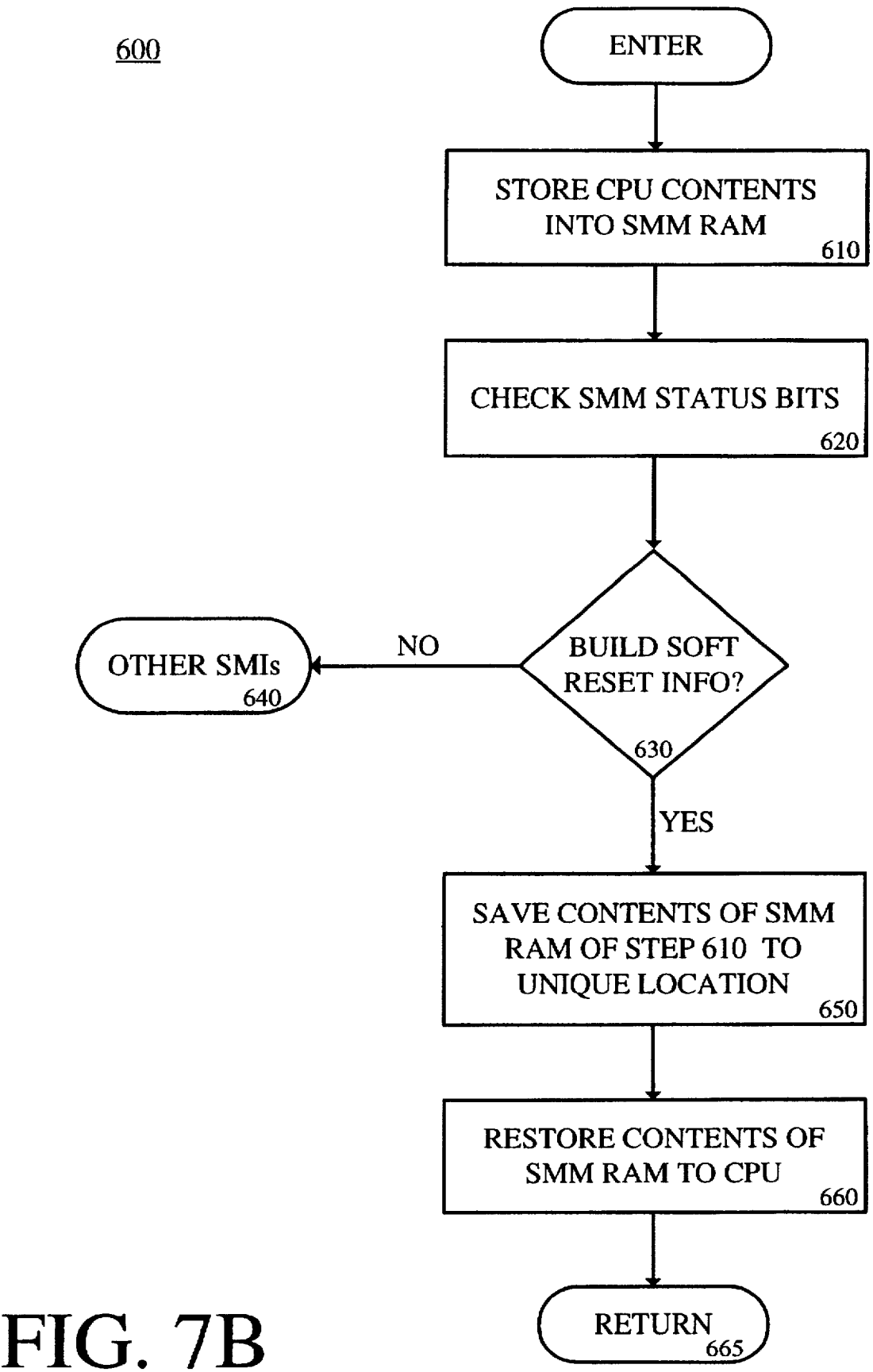
FIG. 7B is a flow diagram illustrating steps of an SMM interrupt handling routine in accordance with the present invention designed to respond to an SMI generated by FIG. 7A.

With reference to FIG. 7B, an SMM handler routine 600 is shown that responds to the SMI generated at step 530 of FIG. 7A. At step 610, the present configuration contents of the processor are stored in memory location 320 of the SMM RAM 300. At step 620, the SMI routine 600 checks the SMM status bits to determine which function is to be executed. At step 630, the SMM handler 600 checks if a request is made to construct the soft reset configuration. If not, processing continues to step 640 where other optional SMM functions are checked (e.g., power management, etc.). If the test at step 630 is satisfied, then at step 650 the SMM handler routine copies the contents of the memory portion 320 into memory portion 330. At step 660, the SMM handler routine 600 then restores the processor configuration from memory portion 320 and exits via step 665.

The preferred embodiment of the present invention, a system and method for emulating a soft reset condition within a processor without need of a dedicated external soft reset pin are thus described. While the present invention has been described in particular embodiments, it should be appreciated that the present invention should not be construed as limited by such embodiments, but rather construed according to the below claims. In particular, the present invention should not be construed as limited to the x86 processor type.

What is claimed is:

1. In a computer system, a method of resetting a processor, said method comprising the steps of:
    (a) storing a soft reset configuration state of said processor within a location of a memory unit, said soft reset configuration state representing a state of said processor immediately following a soft reset of said processor;
    (b) detecting occurrences that cause said processor to enter said soft reset, including:
        detecting one number of a first set of numbers being written to a first input/output port of said computer system;
        detecting bit zero of a second input/output port change from a first logical state to a second logical state; and
        detecting said processor attempting to execute a shut down cycle;
    (c) generating an interrupt signal in response to detecting of one of said occurrences; and
    (d) placing said processor into a soft reset state without use of an external dedicated soft reset pin in response to said interrupt signal, said step (d) further comprising the steps of:
        (1) accessing said soft reset configuration state;
        (2) copying said soft reset configuration state within said memory unit into said processor; and
        (3) directing said processor to execute instructions that are located at a predetermined memory location.

2. A method as described in claim 1 wherein said first set of numbers includes the set consisting of F0h, F2h, F4h, F6h, F8h, FAh, FCh, and FEh, said first input/output port is port 064h, and said second input/output port is port 092h.

3. A method as described in claim 1 wherein said location of said memory unit includes System Management Mode random access memory of said computer system.

4. A method as described in claim 1 wherein said step (c) of generating an interrupt signal in response to detecting one of said occurrences comprises the step of generating a System Management Interrupt (SMI) interrupt.

5. A method as described in claim 4 wherein said steps (1) of accessing and (2) of copying are performed within a System Management Mode (SMM) handler routine.

6. In a computer system, a method of resetting a microprocessor, said method comprising the steps of:
    (a) storing a soft reset configuration state of said microprocessor within a location of memory, said soft reset configuration state representing a state of said microprocessor immediately following a soft reset of said microprocessor, said location of memory within a System Management Mode random access memory;
    (b) detecting occurrences that cause said microprocessor to enter said soft reset, including:
        detecting one number of a first set of numbers being written to a first input/output port of said computer system;
        detecting bit zero of a second input/output port change from a first logical state to a second logical state; and
        detecting said microprocessor attempting to execute a shut down cycle;
    (c) generating a System Management interrupt signal in response to detecting of one of said occurrences; and
    (d) placing said microprocessor into a soft reset state without use of an external dedicated soft reset pin in response to said System Management interrupt signal, said step (d) further comprising the steps of:
        (1) accessing said soft reset configuration state of said microprocessor; and
        (2) copying said soft reset configuration state within said memory unit into said microprocessor.

7. A method as described in claim 6 wherein said first set of numbers includes the set consisting of F0h, F2h, F4h, F6h, F8h, FAh, FCh and FEh.

8. A method as described in claim 7 wherein said first input/output port is port 064h and said second input/output port is port 092h.

9. A method as described in claim 6 wherein said steps (1) of accessing and (2) of copying are performed within a System Management Mode (SMM) handler routine.

10. A method as described in claim 6 wherein said microprocessor contains a write-back cache which is not disturbed upon said step of placing said microprocessor into said soft reset state.

11. In a computer system having a processor, a system for resetting said processor, said system comprising:
    (a) a memory storage unit storing a soft reset configuration state of said processor in a memory location, said soft reset configuration state representing a state of said processor immediately following a soft reset thereof;

(b) detector circuits for detecting occurrences that cause said processor to enter said soft reset, said detector circuits comprising:
   a first detector circuit for detecting one number of a first set of numbers being written to a first input/output port of said computer system;
   a second detector circuit for detecting bit zero of a second input/output port change from a first logical state to a second logical state; and
   a third detector circuit for detecting said processor attempting to execute a shut down cycle;

(c) an interrupt generator circuit coupled to said detector circuits for generating an interrupt signal in response to said detector circuits detecting one of said occurrences; and (d) in response to said interrupt signal, software code executed within said computer system for causing said computer system to place said processor into a soft reset state without use of an external dedicated soft reset pin, said software code comprising:
   (1) first code for accessing said soft reset configuration state of said processor; and
   (2) second code for copying said soft reset configuration state within said memory unit into said processor.

12. A system as described in claim 11 wherein said first set of numbers includes the set consisting of F0h, F2h, F4h, F6h, F8h, FAh, FCh, and FEh, said first input/output port is port 064h, and said second input/output port is port 092h.

13. A system as described in claim 11 wherein said memory location of said memory unit is an SMM RAM location.

14. A system as described in claim 11 wherein said interrupt generator circuit generates a System Management Interrupt (SMI) interrupt to said processor.

15. A system as described in claim 11 wherein said first code and said second code are within a System Management Mode (SMM) handler routine.

16. A system as described in claim 11 wherein said processor comprises a write-back cache that is not disturbed upon said processor being placed into said soft reset.

17. In a computer system having a processor and an address/data bus, a method of resetting said processor, said method comprising the steps of:

(a) storing a soft reset configuration state of said processor within a location of a memory unit, said soft reset configuration state representing a state of said processor following a soft reset of said processor;

(b) detecting occurrences that cause said processor to enter said soft reset, said step (b) comprising the steps of:
   (1) monitoring said address/data bus for a predetermined address value presented thereover by monitoring said address/data bus for an address of an input/output port of said computer system; and
   (2) monitoring said address/data bus for a predetermined data value presented thereover by monitoring said address/data bus for the data values including the set consisting of F0h, F2h, F4h, F6h, F8h, FAh, FCh, and FEh;

(c) generating an interrupt signal in response to detecting of one of said occurrences by generating a System Management Interrupt (SMI) interrupt; and (d) placing said processor into a soft reset state without use of an external dedicated soft reset pin in response to said interrupt signal, said step (d) comprising the steps of:
   (1) copying said soft reset configuration state within said memory unit into said processor; and
   (2) directing said processor to execute instructions that are located at a predetermined memory location.

18. In a computer system, a method of resetting a processor, said method comprising the steps of:

(a) storing a soft reset configuration state of said processor within a location of a memory unit, said soft reset configuration state representing a state of said processor immediately following a soft reset of said processor;

(b) detecting occurrences that cause said processor to enter said soft reset;

(c) generating an interrupt signal in response to detecting of one of said occurrences by generating a System Management Interrupt (SMI) interrupt; and (d) placing said processor into a soft reset state without use of an external dedicated soft reset pin in response to said interrupt signal, said step (d) further comprising the steps of:
   (1) accessing said soft reset configuration state;
   (2) copying said soft reset configuration state within said memory unit into said processor, wherein steps (1) and (2) are performed within a System Management Mode (SMM) handler routine; and
   (3) directing said processor to execute instructions that are located at a predetermined memory location.

19. A method as described in claim 18 wherein said location of said memory unit includes System Management Mode random access memory of said computer system.

20. A method as described in claim 18 wherein said step (b) of detecting occurrences that cause said processor to enter said soft reset comprise the steps of:

detecting one number of a first set of numbers being written to a first input/output port of said computer system, detecting bit zero of a second input/output port change from a logical 0 to a logical 1; and detecting said processor attempting to execute a shut down cycle.

21. A method as described in claim 20 wherein said first set of numbers includes the set consisting of F0h, F2h, F4h, F6h, F8h, FAh, FCh, and FEh, said first input/output port is port 064h, and said second input/output port is port 092h.

* * * * *